Patented Nov. 11, 1952

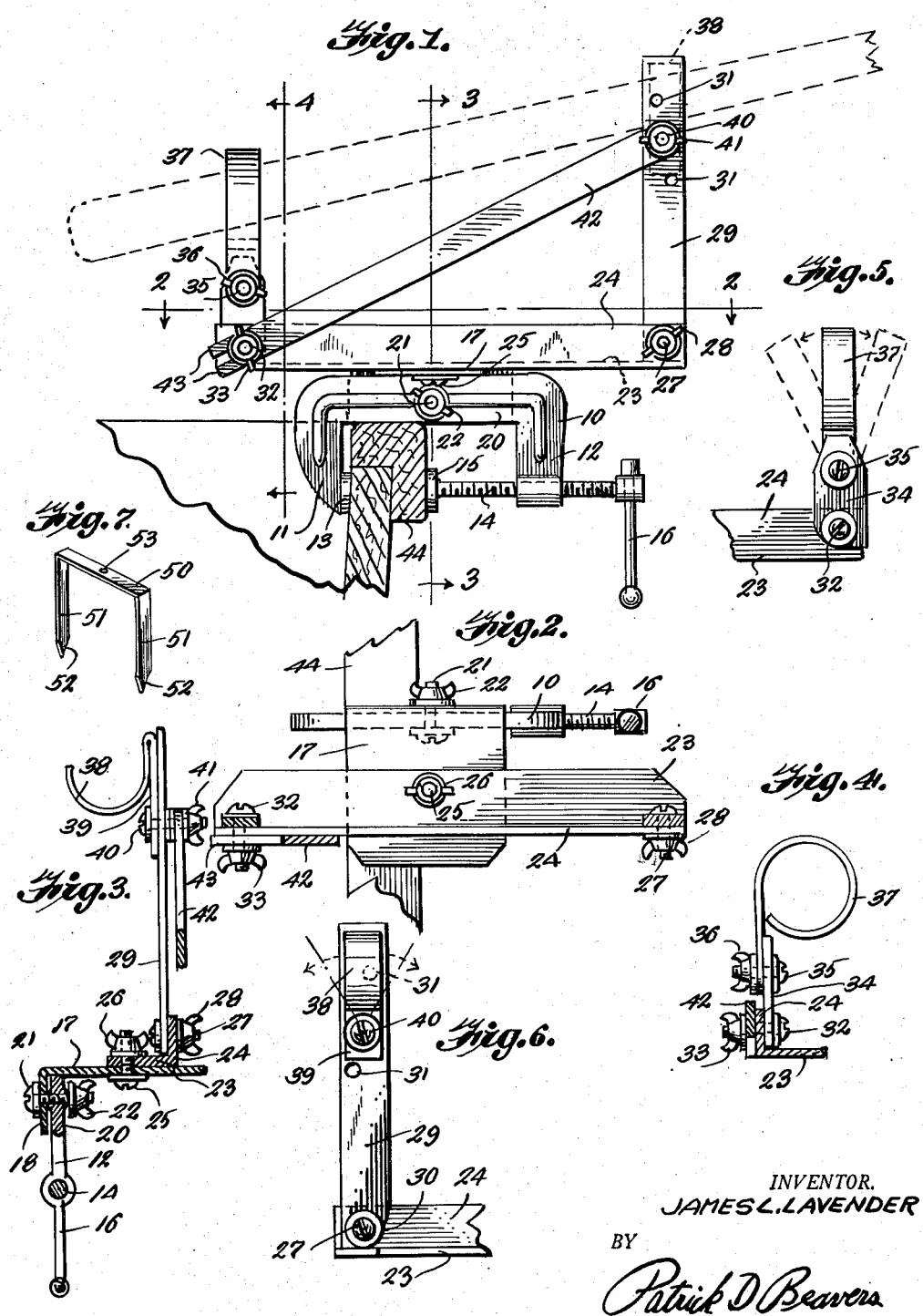

2,617,616

UNITED STATES PATENT OFFICE 2,617,616

FISHING ROD HOLDER

James L. Lavender, Gainesville, Fla., assignor of one-sixth to Hugh E. Wicker, one-sixth to James D. Glicco, and one-sixth to Clifford A. Hall, all of Gainesville, Fla.

Application June 16, 1950, Serial No. 168,505

2 Claims. (Cl. 248—42)

The present invention relates to a fishing rod holder and it consists in the combinations, constructions and arrangements of parts herein described and claimed.

Generally the invention comprises a base to the under side of which is affixed a downwardly extending clamp which is adapted to be clamped upon the side of a rowboat or the like and which base acts as a turntable for a rod holder which is pivotally mounted thereon. The rod holder consists of a horizontal member at the forward end of which is pivotally connected a vertical standard and at the rearward end of which is likewise pivotally connected a relatively shorter vertical standard. A brace member interconnects the rear of the horizontal member with selected points upon the forward standard. A U-shaped support is vertically adjustable upon the forward standard and a ring member is pivotally connected to the upper end of the rear standard. A fishing pole may be inserted into the ring member and laid within the U-shaped support and it will be apparent that the fish pole or rod may be positioned at any desired angle by manipulating the various parts of the device. Provision is also made for substitution of a ground-engaging member for the clamp when it is desired to fish from, for example, the bank of a stream.

It is accordingly an object of the invention to provide a device of the character set forth which is simple in construction, inexpensive to manufacture and yet effective and efficient in use.

Another object of the invention is the provision of a device of the character set forth wherein novel means is provided for mounting the same.

Another object of the invention is the provision of a fish pole holder having means whereby a fish pole may be held in an infinite number of positions.

A still further object of the invention is the provision of novel means for automatically latching the fish pole against outward movement from the device.

Other and further objects of the invention will become apparent from a reading of the following specification, taken in conjunction with the drawing, in which:

Figure 1 is a side elevational view of an embodiment of the invention shown clamped to the side of a boat, Figure 2 is a sectional view taken along line 2—2 of Figure 1, Figure 3 is a sectional view taken along line 3—3 of Figure 1, Figure 4 is a sectional view taken along line 4—4 of Figure 1, Figure 5 is a fragmentary elevational view of a rear standard forming a part of the invention, Figure 6 is a fragmentary elevational view of a front standard forming a part of the invention, and Figure 7 is a perspective view of an alternate mounting for the device illustrated in Figures 1 to 6, inclusive.

Referring more particularly to the drawing, there is shown therein a U-clamp 10 having dependent arms 11 and 12. The lower end of the arm 11 is shaped to form an anvil 13 while the lower end of the arm 12 has transversely threaded therethrough a shaft 14 having a head 15 at its inner end and is provided with an operating handle 16 at its outer end.

A horizontally extending bracket 17 is provided with an integrally formed dependent leg 18 which is joined to the bight portion 20 of the clamp 10 by means of a bolt 21 and wing nut 22.

A base member 23 provided with an upwardly extending longitudinal wall 24 is centrally and pivotally mounted upon the bracket 17 by means of a bolt 25 provided with a wing nut 26.

Adjacent the forward end of the wall 24 there is pivotally connected by means of a bolt 27 and wing nut 28 a forward standard 29 whose innermost end is rounded, as indicated at 30. The standard 29 is provided with a series of spaced openings 31 in the upper portion thereof. Adjacent the rearward end of the wall 24 there is pivotally connected by means of a bolt 32 and a wing nut 33, a relatively short rear standard 34 to the upper end of which is pivotally connected by means of a bolt 35 and wing nut 36 a transversely extending ring 37.

A U-shaped member 38 has integrally formed with one of its legs a dependent bracket 39 which is provided with an opening for the reception therethrough of a bolt 40 which is also adapted to extend through one of the openings 31 and which is provided with a wing nut 41.

Also mounted upon the bolt 40 is one end of a truss member 42 whose other end is formed as a yoke 43 for the reception therein of the bolt 32.

In operation, it will be apparent that a fishing pole or rod, as indicated in dotted lines in Figure 1, may have its butt end inserted through the ring 37 while the U-shaped member 38 will also act as a support for the same. It will also be apparent that the device may be clamped upon the gunwale 44 of a boat by placing the anvil 13 against one side thereof while the head 15 is manipulated into clamping engagement with the other side thereof by means of the handle 16. The U-shaped support 38 may be raised and lowered as desired by the selective engagement of the bolt 40 in the openings 31 to thus regulate the angle to which the fishing pole is held by the device. Again, it will be seen that the fishing pole may be supported at various horizontal angles with respect to the boat by turning the base member 23 upon the bracket 17 after which the same may be rigidly held in such selected position by tightening the thumbscrew 26.

It will also be apparent that since the ring 37 is to be loosely held in position upon its standard 34, that a forward movement of the fishing pole will cause the inner edges of the ring to warp and frictionally engage the butt end of such fishing pole against further outward movement. The device may be readily assembled and disassembled for packing and it will be seen that the rounded inner lower corners of the standards 29 and 34 will permit the inward collapsing of such standards without the necessity of fully disengaging the same from the wall 24.

In Figure 7 there is illustrated a ground-engaging device which may be utilized instead of the clamp 18 and turntable 17. This device comprises an inverted U-shaped member having a flat horizontal bight portion 50 with vertically and downwardly extending integrally formed legs 51 each provided with pointed lower ends 52. The bight portion 50 is centrally provided with an opening 53 for the reception therethrough of the bolt 25 whereby the base 23 may be pivotally mounted thereon.

It will be seen that the ground-engaging device shown in Figure 7 may be readily engaged in the earth of, for example, the bank of a stream or the like by pressing the same downwardly until the legs 51 are fully embedded in such earth.

While but one form of the invention has been shown and described herein, it will be readily apparent to those skilled in the art that many minor modifications may be made without departing from the spirit of the invention or the scope of the appended claims.

What is claimed is:

1. A device of the character described comprising a bracket, means for rigidly supporting said bracket, a base member centrally and revolubly mounted on said turntable, a longitudinally extending vertical wall formed integrally with one side of said base member, a forward standard pivotally connected adjacent the forward end of said wall, a relatively shorter rear standard pivotally connected with said wall adjacent the rear end thereof, a transversely extending ring pivotally connected to one side of the shorter standard, a U-shaped support vertically adjustably connected to the forward standard, and a truss member interconnecting the lower end of the rear standard and the forward standard at its point of connection with said support carried thereby, said means for supporting said turntable comprising a U-clamp having dependent arms, an anvil formed at the lower end of one of said arms, a shaft threaded through the lower end of the other of said arms, a head at the inner end of the shaft and an operating handle at the outer end of said shaft, whereby said clamp may be affixed to the gunwale of a boat or the like.

2. A device of the character described comprising a bracket, means for rigidly supporting said bracket, a base member centrally and revolubly mounted on said bracket, a longitudinally extending vertical wall formed integrally with one side of said base member, a forward standard pivotally connected adjacent the forward end of said wall, a relatively shorter rear standard, a bolt pivotally connecting said rear standard with said wall adjacent the rear end thereof, a wing nut for said bolt, a transversely extending ring pivotally connected to one side of the shorter standard, a U-shaped support vertically adjustably connected to the forward standard, and a truss member interconnecting the lower end of the rear standard and the forward standard at its point of connection with said support carried thereby, said truss having a forked rear end encompassing the bolt connecting said rear standard and said wall, said means for supporting said bracket comprising a U-clamp having dependent arms, an anvil formed at the lower end of one of said arms, a shaft threaded through the lower end of the other of said arms, a head at the inner end of the shaft, and an operating handle at the outer end of said shaft, whereby said clamp may be affixed to the gunwale of a boat or the like.

JAMES L. LAVENDER.

REFERENCES CITED

The following references are of record in the file of this patent:

UNITED STATES PATENTS

| Number | Name | Date |
|---|---|---|
| 1,776,425 | Geisinger | Sept. 23, 1930 |
| 2,199,034 | Witczak | Apr. 30, 1940 |
| 2,454,458 | Kaetker | Nov. 23, 1948 |
| 2,478,176 | Belk | Aug. 9, 1949 |
| 2,540,584 | Jaycox | Feb. 6, 1951 |

FOREIGN PATENTS

| Number | Country | Date |
|---|---|---|
| 106,092 | Australia | Dec. 7, 1938 |